United States Patent
Smid et al.

(10) Patent No.: US 10,338,596 B2
(45) Date of Patent: Jul. 2, 2019

(54) POSITIONING OF A MOBILE PLATFORM USING A BUMPER

(71) Applicant: iTRACK LLC, Rochester, MI (US)

(72) Inventors: Edzko Smid, Oakland Township, MI (US); William Edwards, Miamisburg, OH (US); Wade Hickle, Miamisburg, OH (US)

(73) Assignee: iTRACK LLC, Rochester, MI (US)

( * ) Notice: Subject to any disclaimer, the term of this patent is extended or adjusted under 35 U.S.C. 154(b) by 0 days.

(21) Appl. No.: 14/477,511

(22) Filed: Sep. 4, 2014

(65) Prior Publication Data

US 2015/0063960 A1   Mar. 5, 2015

Related U.S. Application Data

(60) Provisional application No. 61/873,683, filed on Sep. 4, 2013.

(51) Int. Cl.
*G05D 1/02* (2006.01)
*B62D 15/02* (2006.01)

(52) U.S. Cl.
CPC ........ *G05D 1/0225* (2013.01); *B62D 15/0285* (2013.01)

(58) Field of Classification Search
CPC ............... G05D 1/0225; G05D 1/0227; G05D 2201/0206; G05D 2201/0216; B62D 15/0285; Y10S 901/01

See application file for complete search history.

(56) References Cited

U.S. PATENT DOCUMENTS

| | | | | |
|---|---|---|---|---|
| 4,698,775 A | * | 10/1987 | Koch | G05D 1/027 414/265 |
| 4,777,785 A | | 10/1988 | Rafaels | |
| 5,852,984 A | | 12/1998 | Matsuyama et al. | |
| 6,135,228 A | * | 10/2000 | Asada | A61G 5/046 180/168 |
| 6,185,830 B1 | * | 2/2001 | Walters | G03F 7/70408 33/533 |
| 6,278,917 B1 | * | 8/2001 | Bauer | G05D 1/0225 180/168 |
| 6,504,610 B1 | * | 1/2003 | Bauer | G01B 11/272 356/399 |

(Continued)

*Primary Examiner* — James Keenan
(74) *Attorney, Agent, or Firm* — Avery N. Goldstein; Blue Filament Law PLLC

(57) ABSTRACT

A method for positioning a mobile platform at a station that includes moving the mobile platform near a bumper by applying torque to a drive shaft. The mobile platform is maneuvered until a contact stop of the platform is touching the bumper. A locking mechanism is engaged to the mobile platform before the torque to the drive shaft is released to assure position retention at the station. A system for precise positioning of a mobile platform at a station is provided that includes a stationary bumper at the station. A mobile platform has contact stops, a drive shaft, and sensors for measuring contact with the stationary bumper. The mobile platform having a locking mechanism for preventing movement of the drive shaft in response to input from at least one of the sensors in response to contact with the stationary bumper to provide the precise positioning of the mobile platform.

11 Claims, 6 Drawing Sheets

(56) References Cited

U.S. PATENT DOCUMENTS

| | | | | |
|---|---|---|---|---|
| 6,551,049 B2* | 4/2003 | Gravell | ............... | B23Q 1/66 |
| | | | | 414/396 |
| 6,611,738 B2* | 8/2003 | Ruffner | ............... | G05D 1/0225 |
| | | | | 318/581 |
| 6,658,325 B2* | 12/2003 | Zweig | ............... | G05D 1/0011 |
| | | | | 318/568.1 |
| 7,066,291 B2* | 6/2006 | Martins | ............... | G05D 1/0225 |
| | | | | 180/167 |
| 7,384,228 B2* | 6/2008 | Kuipers | ............... | G03F 7/7075 |
| | | | | 414/222.04 |
| 7,423,402 B2* | 9/2008 | Sano | ............... | G05D 1/0255 |
| | | | | 180/170 |
| 8,509,981 B2* | 8/2013 | Pfeiffer | ............... | G05D 1/0225 |
| | | | | 104/137 |
| 8,677,524 B2* | 3/2014 | Kume | ............... | A61G 5/04 |
| | | | | 5/613 |
| 8,718,859 B2* | 5/2014 | Kume | ............... | A61G 5/006 |
| | | | | 180/168 |
| 2006/0111814 A1* | 5/2006 | Hachitani | ............... | G05D 1/027 |
| | | | | 700/258 |
| 2008/0134458 A1 | 6/2008 | Ziegler | | |
| 2011/0303473 A1 | 12/2011 | Pickard et al. | | |
| 2013/0061416 A1 | 3/2013 | Dyson et al. | | |

\* cited by examiner

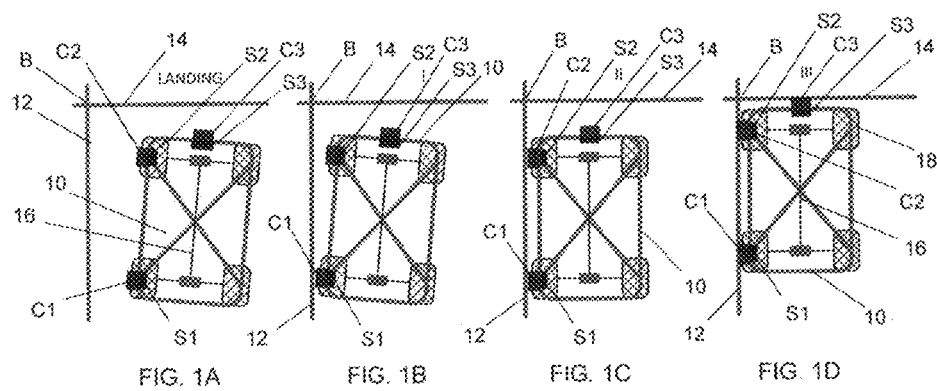
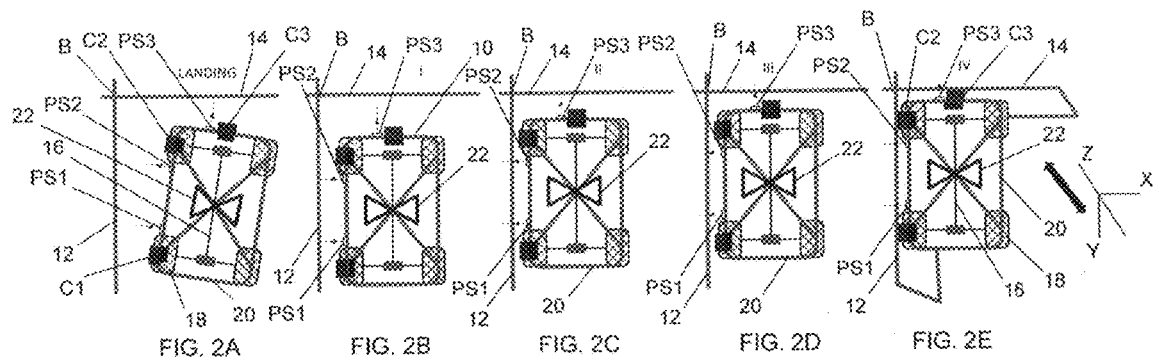

POSITIONING OF A MOBILE PLATFORM USING A BUMPER

RELATED APPLICATIONS

This application is a non-provisional application that claims priority benefit of U.S. Provisional Application Ser. No. 61/873,683 filed 4 Sep. 2013; the contents of which are hereby incorporated by reference.

FIELD OF THE INVENTION

The present invention in general relates to mobile platforms, and in particular to a positioning system that facilitates the movement and parking of a mobile platform (vehicle) into a location with a high degree of precision, while also keeping the platform in place.

BACKGROUND OF THE INVENTION

The growth of the use of robots in manufacturing, as well as flexible manufacturing has necessitated the need to move robots to different stations along an assembly line. The required robotic movement has necessitated the mounting of robots on mobile platforms, where the platforms must be positioned into a known location at a repeatable high accuracy in the order of less than 1 mm. Examples applications of robots mounted to mobile platforms include the maneuvering of a robotic assembly arm to a location where the robotic arm can execute assembly tasks, or the maneuver of a robotic surgery system to the right place to conduct surgery on a patient.

In general, in order to achieve a high level of accuracy and precision when moving a mobile platform two technologies will have to operate in concert, a location tracking system, to measure at high accuracy where the vehicle is, and at what orientation, and a vehicle platform control system that can move the vehicle at high precision in the desired position. While vehicle control systems with high accuracy are readily available, these control systems are typically slow in order to maintain precision control. Furthermore, prior art systems that attain a higher speed and maintain accuracy tend to be overly complex for most applications. Thus, there has conventionally been a tradeoff between the complexity of a control system and the level of accuracy attained by a control system. This trade-off between the complexity and level of accuracy typically also applies to the tracking systems.

Thus, there exists a need for a mobile platform that can be repositioned at a high level of precision and accuracy that is also cost effective.

SUMMARY OF THE INVENTION

A method for positioning a mobile platform at a station that includes moving the mobile platform near a bumper by applying torque to a drive shaft. The mobile platform is maneuvered until a contact stop of the platform is touching the bumper. A locking mechanism is engaged to the mobile platform before the torque to the drive shaft is released to assure position retention at the station.

A system for precise positioning of a mobile platform at a station is provided that includes a stationary bumper at the station. A mobile platform has a plurality of contact stops, a drive shaft, and sensors for measuring contact with the stationary bumper. The mobile platform having a locking mechanism for preventing movement of the drive shaft in response to input from at least one of the sensors in response to contact with the stationary bumper to provide the precise positioning of the mobile platform.

BRIEF DESCRIPTION OF THE DRAWINGS

FIGS. 1A-1D illustrate a method for positioning a mobile platform with contact stops according to embodiments of the invention;

FIGS. 2A-2E illustrate a method for positioning a mobile platform configured with short range proximity sensors in addition to contact stops according to embodiments of the invention;

DETAILED DESCRIPTION OF THE PREFERRED EMBODIMENTS

Figure 3:
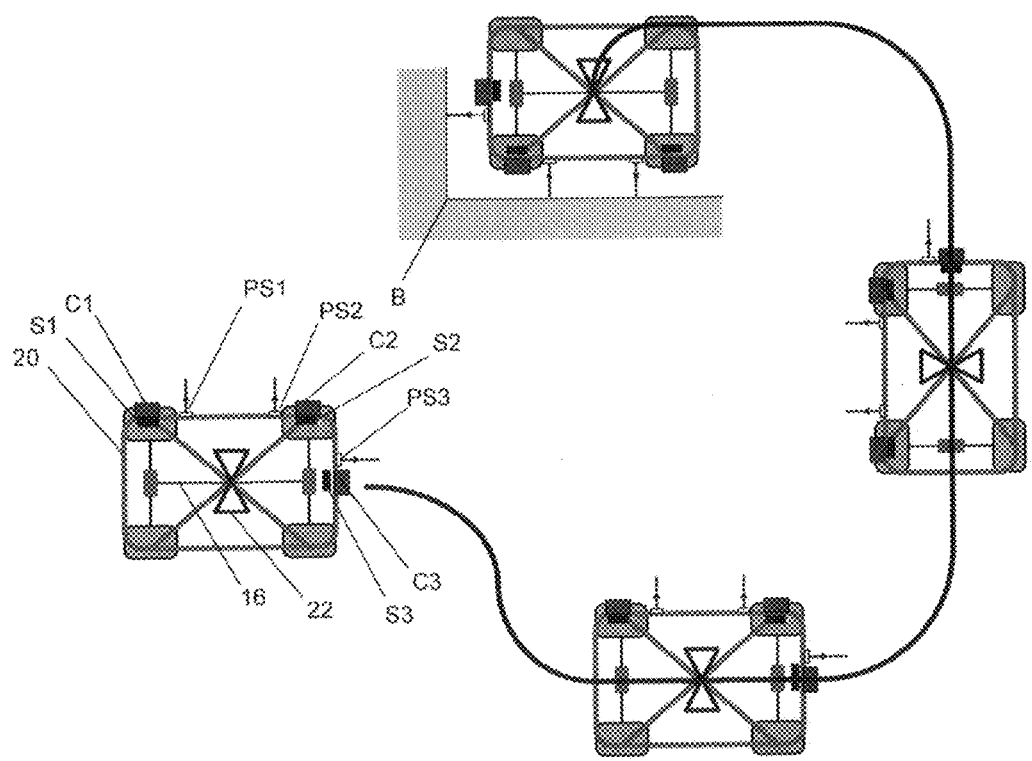
FIG. 3 illustrates the parking of the mobile platform of FIG. 2 according to embodiments of the invention.

An inventive positioning system is provided that facilitates the movement and parking of a mobile platform (vehicle) into a location or station with a high degree of precision, while also keeping the platform in place. The present invention has utility in a variety of fields including robotic manufacturing, remote inspection and testing, and surgery. In contrast to the prior art, an inventive system can locomote at a comparatively high speed of tens or hundreds or even thousands of rotations per minute and only slow in proximity to a barrier. As used herein. A "barrier" and "bumper" are used synonymously to refer the fixed component of controlled contact between a mobile platform and fixed structure defining a known position. The high degree of precision is achieved by driving the platform slowly into the barrier. In some embodiments, at least three stops on the vehicle make contact with the barrier to determine both position and orientation. Once the position and orientation of the platform is determined, and before the torque on the platform drive system is released, a locking mechanism is engaged to fix the platform position. In a particular embodiment, the locking mechanism is a brake is applied at the drive shaft of the platform wheels so as to maintain a sheer force on the tires to keep the vehicle in place. It is appreciated that other locking mechanisms are operative herein an illustratively include a locking pin engaging a transmission gear; a solenoid lock, and an electro-mechanical locking device like an Electro-Magnet. It is noted that the sheer force on the wheels should exceed any anticipated forces on the vehicle while in a parked position. It is appreciated that a mobile platform according to the present invention is readily translated on a continuous track (caterpillar tread), or an inch worm-type propulsion system. The application of the locking mechanism to the drive train also allows for a mechanical drive system with backlash or low resolution motion feedback to be positioned accurately. Embodiments of mobile platform may be an omni-directional vehicle that has the ability to drive sideways, or may have a four-wheel steer system.

The platform is equipped in some embodiments with a contact point stop adapted to engage the barrier, while in other embodiment in which lateral movement along the barrier after contact is desired, the platform is equipped with a caster wheel. In still other embodiments, the caster wheel is mounted with a sensor that measures the force on the caster wheel; with the applied force exceeding a preselected threshold is used to engage the locking mechanism.

The use of a platform stop-bumper to drive up against positions, a mobile platform in known designated positions at a high level of accuracy, while eliminating the complexity of a highly accurate position tracking system, and for a highly precise vehicle control system. In certain embodiments of the inventive mobile platform low cost proximity sensors are combined with the use of the bumper to improve the speed of positioning of the platform. The mobile platform or vehicle controller used in embodiments of the invention has the ability to command the vehicle. The controller includes the control algorithms for dead-reckoning and algorithms to perform the bumper move. In still other embodiments, the controller includes the input capture for the proximity sensors to line-up the platform before executing the contact barrier-bumper.

Embodiments of the inventive method provide additional benefits for autonomous guidance of vehicle platforms. Typical autonomous navigation and control systems use a combination of dead-reckoning (information from wheel speeds and inertial sensors) with external absolute position reference information (e.g., laser based, radio frequency (RF) based, based on magnetic strips, or on simultaneous localization and mapping (SLAM). External absolute reference frame systems tend to be costly, often require extensive installation efforts, and are typically sensitive to environmental conditions. Embodiments of the inventive method described herein can be used as a low cost highly accurate external positioning reference system for this purpose. For applications that do require the vehicle platform to travel longer distances between stations, without the opportunity to park at a stop-bumper, there will still be a need for an external position reference and tracking system. These could be any laser-based, or RF-based as for example detailed in any of U.S. Pat. No. 8,417,444; U.S. Pat. No. 8,010,133; U.S. Pat. No. 7,983,694; U.S. Pat. No. 7,403,783; or U.S. Pat. No. 8,214,147.

Besides the benefit of eliminating the need for complex locating, vehicle control, and high performance mechanical drive trains with high speed and no backlash, certain embodiments of the present invention are used to position the mobile platform also improve the robustness and durability of a system using embodiments of the inventive method. Particularly when the inventive system is installed in a harsh machining and manufacturing environment, where conditions may prohibit some of the complex technologies that otherwise would be required.

The infinite operating scenario of certain inventive embodiments is as follows:
1) Manually drive the platform into the proximity of a bumper.
2) Activate the automatic bumper platform alignment task that will park the vehicle in the accurately known position with the stops against the bumper.
3) Activate a path following maneuver that will autonomously navigate the vehicle into the proximity of another bumper station.
4) Activate the automatic bumper platform alignment task that will park the vehicle in the accurately known position with the stops against the bumper.
5) Use the robotic arm or allow other platform payload to execute its task.
6) Continue to the next task from step 3)

Each time the vehicle lines up with the barrier, the system regains its accuracy to drive to the next station based on dead-reckoning.

Path following for embodiments of the mobile platform, as mentioned in the preceding paragraphs, can be conducted either by command following, "dead-reckoning", or by autonomous guidance with position tracking.

Command following means that the platform or vehicle motion commands are recorded in time, and that the vehicle will be provided with exactly the same drive commands over time, during the path following process.

Dead-reckoning is a method that uses wheel speeds and inertial sensors to estimate the platform or vehicle motion in space over time. The estimation of the vehicle position and orientation is then compared with the vehicle motion during the recording, or is compared to a pre-programmed reference profile. The vehicle is commanded to follow the desired trajectory in time.

Path following with absolute position references means that the platform or vehicle constantly compares its estimated position from dead-reckoning, to an absolute reference position from an external geo-location system. During path following, the vehicle is constantly correcting its motion to follow the desired trajectory accurately.

Besides the simplicity benefit of eliminating the need for expensive positioning technologies, embodiments of the mobile platform also improves the robustness and durability of a system using this method. Particularly when the system is installed in a dirty machining and manufacturing environment, where conditions may prohibit some of the expensive technologies needed otherwise. While the present invention is further illustrated with respect to an orthogonal barrier structure, it is appreciated that a barrier operative in the present invention can have any number of shapes including a linear barrier, as well as posts of various cross sections including circular, rectilinear, and polygonal cross-sections.

Referring now to the figures, where like elements are identified with identical numerical designators between figures, FIGS. 1A-1D illustrate an embodiment of a first inventive method for positioning a mobile platform 10 with a high degree of precision, when the platform 10 is in an unknown position and orientation, but is relatively close to a bumper B. As shown in FIG. 1A, the platform 10 has a set of wheels 18 that are powered by a drive train 16. The platform 10 is configured with three or more contact stops (C1, C2, C3) for positioning the platform 10 with respect to a landing right angle bumper B with sides 12 and 14 that may define or correspond to a X-Y plane. In FIG. 1B the platform is maneuvered until a first contact is made between bumper side 12 and contact stop C1 (it is noted that C2 may also be used). As shown in FIG. 1C, the platform 10 continues to move toward bumper side 12 until contact stop C2 hits the bumper side 12 (alternatively C1 will contact side 12 if C2 was first to contact side 12). In FIG. 1D with both contact stops C1 and C2 touching bumper side 12, the platform 10 rides along bumper side 12 until contact stop C3 touches. It is noted that the bumper B may also have markings to facilitate for variation in the Z axis or vertical plane to adjust for non-planar conditions experienced by the platform 10 (see FIG. 2E). A platform 20 in certain embodiments having a vertical adjustment mechanism 22 to position a platform supported payload such a robotic arm to a controlled vertical position. A vertical adjustment mechanism operative herein includes those conventional to the art such as a worm gear, stepper motors, and the like.

FIGS. 2A-2E show a platform 20 configured with short range proximity sensors (PS1, PS2, PS3) in addition to contact stops (C1, C2, C3). Examples of proximity sensors may include, but are not limited to, infra-red, sonar, magnetic, etc. The use of proximity sensors allows the platform to move into position faster since contact with the landing right angle bumper B is only done once an initial alignment of the platform is determined with the proximity sensors (PS1, PS2, PS3). For example, the platform 20 may initially be moved to within an inch of the bumper B as shown in FIGS. 2B-2D, and then moved into final position with the contact stops (C1, C2, C3) touching the sides 12 and 14 of the bumper B as shown in FIG. 2E.

Furthermore, in certain embodiments an absolute tracking reference system, for example, based on RF, laser, or magnetic strips may be used to drive the platform to a first landing position, and then apply then use the contact stops (C1, C2, C3) and proximity sensors (PS1, PS2, PS3) for the final positioning of the platforms 10 or 20.

FIG. 3 illustrates the parking of the mobile platform 20 of FIG. 2 where an operator manually maneuvers the platform 20 near the bumper B, and the operator then activates the proximity sensors (PS1, PS2, PS3) to automatically have the platform position itself with the bumper B with an auto park program.

Figure 4:
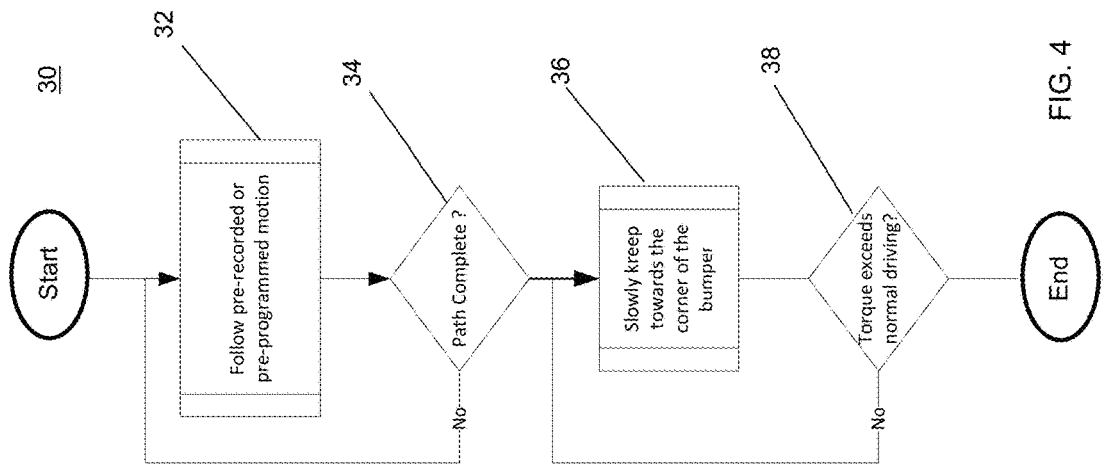
FIG. 4 illustrates a flowchart for a method for parking a platform or autonomous vehicle using only bumpers B and contact stops as shown in FIGS. 1A-1D.

FIG. 4 illustrates a flowchart for a method 30 for parking a platform or autonomous vehicle using only bumpers B and stop contacts as shown in FIGS. 1A-1D. The platform 10 follows a pre-recorded or pre-programmed path (step 32), either from recorded motion commands, or following a series of position waypoints from a trajectory, until the path is complete (step 34). When the path is complete, the vehicle should be in the vicinity of the park location. With bumpers only, the vehicle will be commanded to slowly drive into the bumpers (step 36) on two corner sides or the vehicle, until the torque on the wheel shaft or motor drive exceeds a certain limit (step 38), indicating the vehicle is actually pushing into the wall. This is when the parking maneuver is complete.

Figure 5:
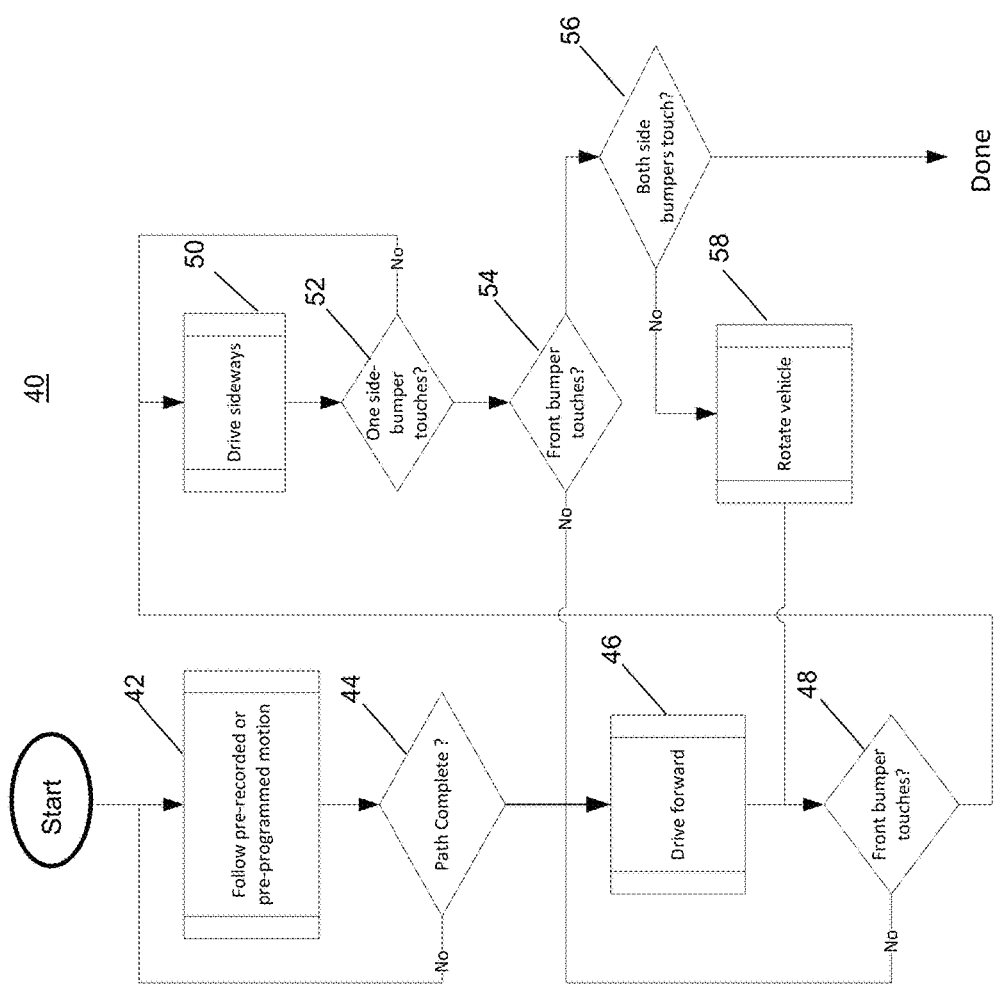
FIG. 5 illustrates a flowchart for a method for parking a platform or autonomous vehicle using contact stops and pressure sensors or tactical sensors mounted to a platform or vehicle according to embodiments of the invention.

FIG. 5 illustrates a flowchart for a method 40 for parking a platform or autonomous vehicle using stop contacts and pressure sensors or tactical sensors (S1, S2, S3) mounted to the platform or vehicle. The platform 20 follows a pre-recorded or pre-programmed path (step 42), either from recorded motion commands, or following a series of position waypoints from a trajectory, until the path is complete (step 44). After the path is complete, the vehicle will drive forward first (step 46), until the forward or front contact stop C3 touches the wall 14 of the bumper B (step 48). Then the vehicle will be commanded to drive sideways (step 50) until one of the side contact stops (C1, C2) touches the wall 12 of the bumper B (step 52). A determination (step 54) is made whether the forward or front contact C3 is still contacting the bumper B, where if the contact C3 is not touching the bumper B, the platform is again driven forward (step 46) based on the determination made at step 54. The vehicle is subsequently commanded to rotate (step 58), based on a determination of whether both side contact stops (C1, C2) are touching the wall 12 of the bumper B. The process 40 stop when all three contact stops (C1, C2, C3) are touching the walls (12, 14) of the bumper B.

Figure 6:
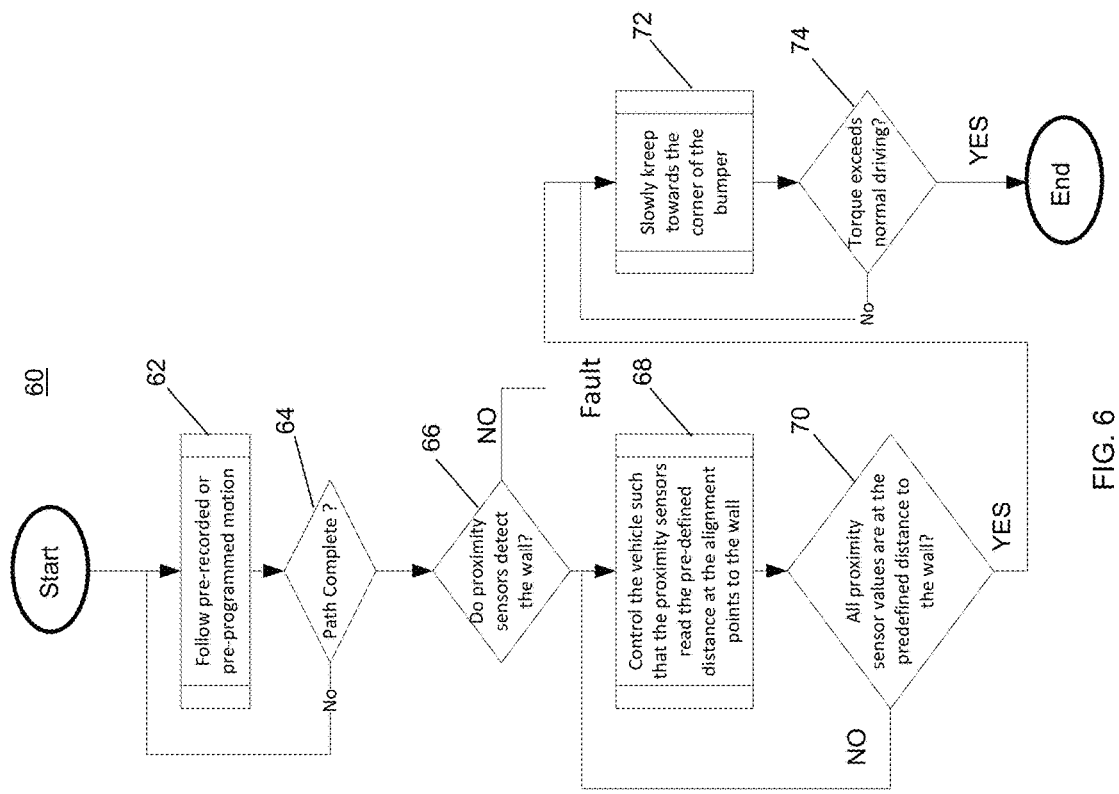
FIG. 6 illustrates a flowchart for a method for parking a platform or autonomous vehicle using proximity sensors to align the vehicle close to the walls (12, 14) of a bumper according to embodiments of the invention.

FIG. 6 illustrates a flowchart for a method 60 for parking a platform or autonomous vehicle using proximity sensors to align the vehicle close to the walls (12, 14) of the bumper B, after the pre-recorded path or pre-programmed path following has completed. The platform 20 follows a pre-recorded or pre-programmed path (step 62), either from recorded motion commands, or following a series of position waypoints from a trajectory, until the path is complete (step 64). A determination is made at step 66 if the proximity sensors (PS1, PS2, PS3) detect the walls (12, 14) of the bumper B. At step 68, the platform 20 is controlled so that the proximity sensors (PS1, PS2, PS3) read a predefined distance at the alignment points to the walls (12, 14) of the bumper B. The vehicle motion commands are aimed to control the error between the measurement from the proximity sensors and a pre-defined distance from the wall to zero. Following a positive confirmation (step 70) that all the proximity sensors (PS1, PS2, PS3) are at the predefined distances to the walls (12, 14) of the bumper B and the platform 20 is aligned, the platform 20 slowly creeps or moves towards the corner of the bumper B (step 72). A determination is made at step 74 whether the torque exceeds normal driving conditions for free movement. If the torque exceeds normal driving conditions, this indicates that the platform is now in contact with the walls (12, 14) of the bumper B and the process concludes with a brake applied to the drive train.

Figure 7:
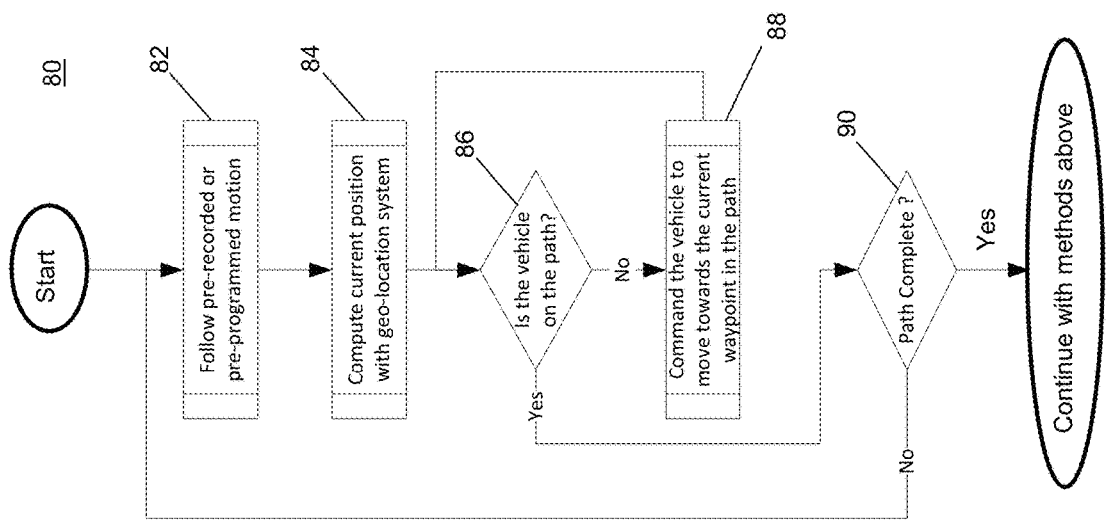
FIG. 7 illustrates a flowchart for a method for a mobile platform or vehicle to follow a course or path by following with an absolute position reference system according to embodiments of the invention.

FIG. 7 illustrates a flowchart for a method 80 for a mobile platform or vehicle to follow a course or path by following (step 82) with an absolute position reference system, where the vehicle constantly compares (step 86) its estimated position from dead-reckoning, to an absolute reference position from an external geo-location system (step 84) to determine if the platform or vehicle is on path. During path following, the vehicle is constantly correcting its motion to follow the desired trajectory accurately by following commands to move towards the current waypoint in the path (step 88). A determination is made at step 90 of whether the platform or vehicle has completed the path or course. If the path or course has been completed, the parking maneuver is executed for the platform or vehicle as described in the preceding methods.

The foregoing description is illustrative of particular embodiments of the invention, but is not meant to be a limitation upon the practice thereof. The following claims, including all equivalents thereof, are intended to define the scope of the invention.

The invention claimed is:

1. A method for positioning a mobile platform at a station, said method comprising:
   autonomously moving said mobile platform near a bumper by applying torque to a drive shaft;
   maneuvering said mobile platform until at least three non-collinearly positioned stops on said mobile platform are in contact with said bumper;
   determining both position and orientation of said mobile platform relative to the bumper; and
   then, applying a locking mechanism to said mobile platform before the torque to said drive shaft is released to assure positioning at the station in response to input from at least one sensor for measuring contact of said stops with said bumper.

2. The method of claim 1 wherein said mobile platform is omni-directional.

3. The method of claim 1 wherein a first contact stop of the at least three non-linear stops is a caster wheel.

4. The method of claim 1 wherein said mobile platform is configured with proximity sensors for automatically aligning said platform in contact with said bumper.

5. The method of claim 1 further comprising repositioning said mobile platform vertically based on the vertical position of a first contact relative to a preselected height position of said bumper.

6. A system for precise positioning of a mobile platform at a station, said system comprising:
   a stationary bumper at said station; and
   an autonomous mobile platform with a plurality of non-collinearly positioned contact stops, a drive shaft, and sensors for measuring contact with said stationary bumper, said mobile platform having a locking mechanism for preventing movement of the drive shaft in response to simultaneous input from at least three points of contact of the sensors for measuring contact with said stationary bumper to provide the precise positioning of said mobile platform.

7. The system of claim 6 wherein said mobile platform further comprises a plurality of proximity sensors to automatically position said mobile platform against said bumper.

8. The system of claim 6 wherein said mobile platform is omni-directional.

9. The system of claim 6 wherein said mobile platform further comprises a caster.

10. The system of claim 9 wherein said caster has a sensor for measuring contact coupled thereto to trigger said locking mechanism to be applied.

11. The system of claim 6 further comprising a vertical platform adjustment mechanism activated in response to a vertical position sensing of one of said plurality of non-linear contact stops relative to said stationary bumper.

* * * * *